US012565116B2

(12) United States Patent
Vlaiko et al.

(10) Patent No.: US 12,565,116 B2
(45) Date of Patent: Mar. 3, 2026

(54) DATA TRANSFER FOR VEHICLES

(71) Applicant: Sandisk Technologies, Inc., Milpitas, CA (US)

(72) Inventors: Julian Vlaiko, Kfar Saba (IL); Judah Gamliel Hahn, Ofra (IL); Aki Bleyer, Even Yehuda (IL); Shay Benisty, Beer Sheva (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 231 days.

(21) Appl. No.: 18/485,140

(22) Filed: Oct. 11, 2023

(65) Prior Publication Data

US 2025/0121731 A1      Apr. 17, 2025

(51) Int. Cl.
B60L 53/80         (2019.01)
B60L 53/62         (2019.01)

(52) U.S. Cl.
CPC ............... B60L 53/80 (2019.02); B60L 53/62 (2019.02)

(58) Field of Classification Search
None
See application file for complete search history.

(56) References Cited

U.S. PATENT DOCUMENTS

2002/0083148 A1*  6/2002  Shaw ...................... H04L 67/61
                                                         709/217
2009/0027056 A1*  1/2009  Huang ................. G01R 31/392
                                                         320/132

2011/0055299 A1*  3/2011  Phillips ............... G06F 9/45533
                                                         707/827
2011/0224868 A1*  9/2011  Collings, III ......... G07C 5/085
                                                         701/33.4
2012/0158229 A1*  6/2012  Schaefer ............... B60L 53/665
                                                         320/109
2013/0026972 A1*  1/2013  Luke ....................... B60L 55/00
                                                         320/167
2016/0170840 A1*  6/2016  Heo ....................... G06F 16/113
                                                         707/652

(Continued)

OTHER PUBLICATIONS

Tesla's Official Advice for what USB Drive to buy to Sentry/ Dashcam, by r/teslamotors, available online at https://www.reddit. com/r/teslamotors/comments/f671g3/teslas_official_advice_for_ what_usb_drive_to_buy/?rdt=61743, last accessed Jul. 26, 2025 (Year: 2020).*

(Continued)

*Primary Examiner* — Daniel L Greene
(74) *Attorney, Agent, or Firm* — Patterson + Sheridan, LLP

(57)                ABSTRACT

A vehicle battery includes at least one battery cell and a battery controller for charging the at least one battery cell via a power interface of the vehicle battery. The vehicle battery further includes a battery memory and a data interface to transfer data between the battery memory and a data device external to the vehicle. A data storage controller of the vehicle battery transfers, via the data interface, data between the battery memory and the data device while the vehicle battery is removed from the vehicle. In one aspect, the data device performs at least one of transferring data from a battery memory to a memory of the data device and transferring data from the memory of the data device to the battery memory while the data device is physically connected to the vehicle battery.

19 Claims, 5 Drawing Sheets

Battery Management Module 20

Battery Monitoring Data 22

User Profile 24

Data Transfer Module 26

Vehicle Sensor and/or Video Data 28

Additional Data 29

(56) References Cited

U.S. PATENT DOCUMENTS

2017/0182908 A1\* 6/2017 Yang ....................... B60L 53/00

OTHER PUBLICATIONS

Sustainable Bus; "Autosan aims to build an electric bus with removable battery to cut stopover time"; Sustainable Bus; Apr. 10, 2020; available at: https://www.sustainable-bus.com/electric-bus/autosan-aims-to-build-an-electric-bus-with-removable-battery/.

Jameson Dow; "Rivian patents "removable auxiliary battery" for its R1T electric pickup truck"; Electrek; Feb. 21, 2019; available at: https://electrek.co/2019/02/21/rivian-patent-auxiliary-battery-r1t-electric-pickup-truck/.

Mostafa Rachwani; "Swap and go: electric trucks to run between Sydney and Brisbane using exchangeable batteries"; The Guardian; Apr. 28, 2021; available at: https://amp.theguardian.com/australia-news/2021/apr/29/swap-and-go-electric-trucks-to-run-between-sydney-and-brisbane-using-exchangeable-batteries.

\* cited by examiner

DATA TRANSFER FOR VEHICLES

BACKGROUND

Vehicles increasingly record more data, such as video data and sensor data. Such data recorded by the vehicle may be used, for example, for accident analysis or troubleshooting problems with the vehicle. Data may also be downloaded by a vehicle, such as for a software update or to provide the vehicle with information specific to a user of the vehicle, such as for deliveries to be made by the driver or customer pick-up information for customers to be picked up by the diver. The transfer of data from the vehicle or to the vehicle may occur over a data link, such as by using a wireless internet connection or a dedicated physical link provided by a service technician.

In addition, more vehicles rely on batteries to power the vehicle, such as electric or hybrid cars, trucks, and buses. Such vehicle batteries can be charged at charging stations or at home. In some cases, the batteries may be swapped out for fully charged batteries to save time so that the vehicle can continue operation without having to wait for the battery to charge.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
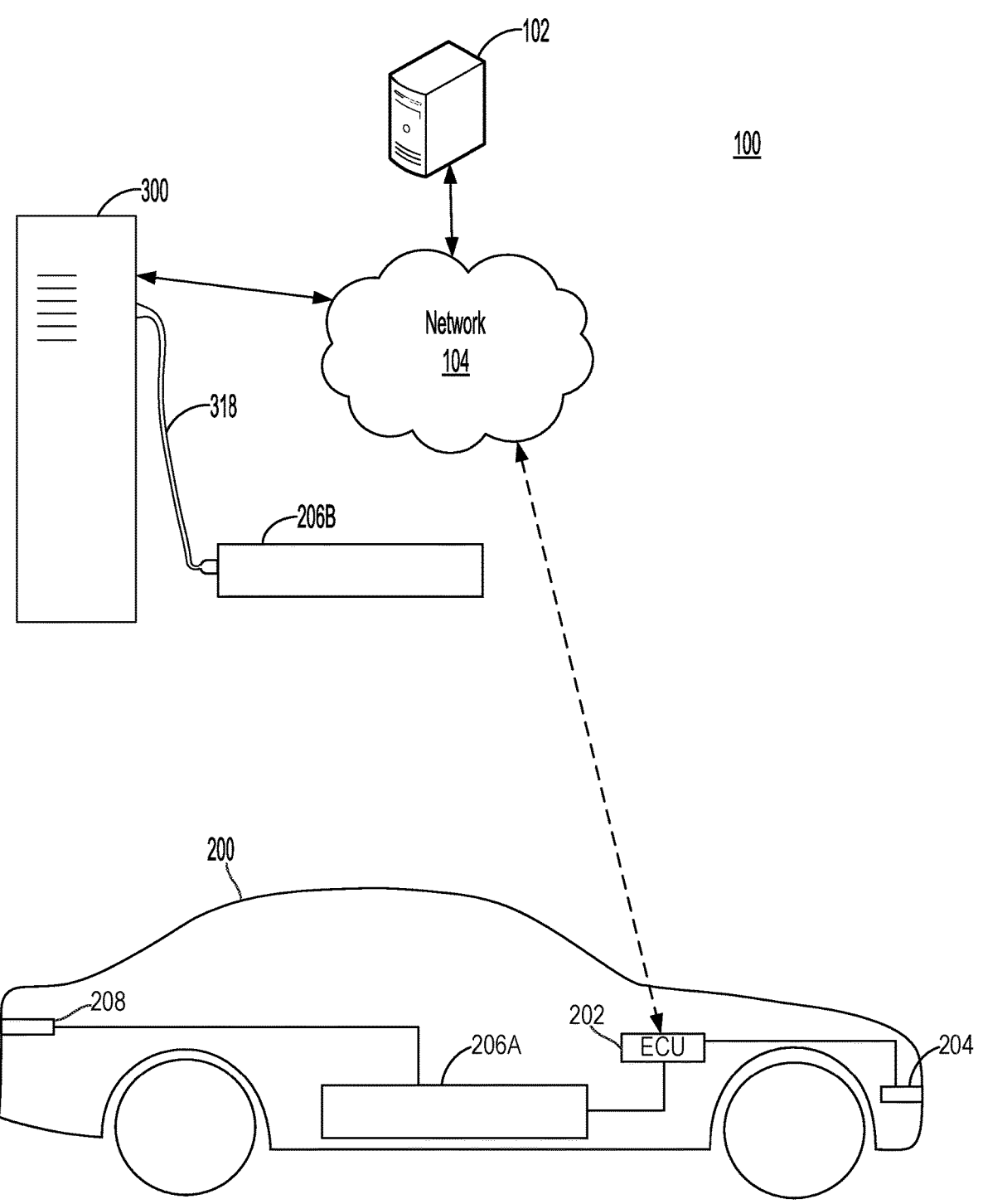
FIG. 1 illustrates a system for transferring data between a vehicle and an external data device according to one or more embodiments.

FIG. 1 illustrates system 100 for transferring data between vehicle 200 and data device 300 according to one or more embodiments. As shown in FIG. 1, data device 300 is external to or separate from vehicle 200. In the example of FIG. 1, data device 300 is removably connected to vehicle battery 206B for both charging vehicle battery 206B and for transferring data from vehicle battery 206B to data device 300. In this regard, data device 300 can include, for example, an Electric Vehicle (EV) charger. In other implementations, data device 300 can be a dedicated data transfer device, such as a desktop or laptop computer, that does not charge a vehicle battery.

Although FIG. 1 depicts vehicle 200 as an automobile, vehicle 200 can alternatively include, for example, a truck, electric bicycle, bus, motorcycle, train, airplane, boat, or helicopter. Vehicle 200 in FIG. 1 includes Electronic Control Unit (ECU) 202 that provides electronic control of vehicle 200. ECU 202 receives video data or image data from camera 204 and sensor data from sensor 208, which ECU 202 can store in a battery memory of vehicle battery 206A. In some cases, the battery memory may store a backup copy of data recorded by vehicle 200, and in other cases, the battery memory may store the only copy of the video, image, and/or sensor data recorded by vehicle 200. In some implementations, the battery memory can be used as an event data recorder or "black box" for recording data from immediately before, during, and/or after a crash. Since vehicle batteries are generally designed to be protected from fire due to the risk of explosion, a memory located in the vehicle battery can serve as a black box designed to withstand extreme conditions. In implementations where the vehicle battery is removable for recharging, the vehicle battery's removable and portable design can also facilitate its use as a black box designed to be recovered from the scene of an accident.

ECU 202 can include one or more processors including, for example, circuitry such as one or more Central Processing Units (CPUs), Graphics Processing Units (GPUs), microcontrollers, Digital Signal Processors (DSPs), Application-Specific Integrated Circuits (ASICs), Field Programmable Gate Arrays (FPGAs), hard-wired logic, analog circuitry and/or a combination thereof. In some implementations, ECU 202 can include a System on a Chip (SoC) that includes a processor with local memory.

In addition to powering vehicle 200, vehicle battery 206A can be used to transfer data between vehicle 200 and data device 300, as discussed in more detail below. Vehicle battery 206A is removable from vehicle 200 in the example of FIG. 1 for replacement with a fully charged replacement battery, such as vehicle battery 206B. This can decrease the operational downtime of vehicle 200 as compared to recharging vehicle battery 206A while it remains inside vehicle 200 because a driver does not have to wait for the battery to recharge. This can be especially useful for delivery trucks, taxis, or self-driving vehicles such as robotaxis and driverless trucks that can be operated more continuously. In addition to quickly providing a fully charged battery, swapping batteries can provide a low-overhead and secure method of transferring data between the vehicle and a data device and/or cloud service.

The relatively frequent charging of the vehicle battery, such as on a daily or weekly basis, can also provide renewed storage capacity for storing additional data after each time the vehicle battery is replaced or recharged, since the data previously stored in the vehicle battery can be transferred to data device 300 and the replacement battery or recharged battery may no longer need to store all of the data transferred from the vehicle battery to the data device. In addition, data such as software updates or delivery information can be transferred from data device 300 to vehicle 200 with the replacement battery or while recharging the vehicle battery. In this regard, the vehicle battery in some implementations may not be removable for charging but may nonetheless provide a low-overhead and secure method of transferring data to data device 300 while the vehicle battery is recharged.

As shown in the example of FIG. 1, data device 300 physically connects to vehicle battery 206B via cable 318, which can include both data transfer wiring and battery charging wiring. Data stored in vehicle battery 206B can be transferred to data device 300 and data can be transferred from data device 300 to vehicle battery 206B to eventually be connected to ECU 202 and/or other processors of vehicle 200.

In addition, data device 300 sends data received from vehicle battery 206B to remote data device 102 via network 104. Remote data device 102 may also provide data device 300 additional data to be transferred to vehicle battery 206B. In some implementations, remote data device 102 or data device 300 may associate a user profile retrieved from the battery memory of vehicle battery 206B with the additional data to be stored in a replacement battery for the same user or in the same vehicle battery if it is to be reused in the same vehicle. The data transferred to or from vehicle battery 206B may be encrypted or otherwise protected until decrypted or otherwise securely accessed by remote data device 102 or a processor of vehicle 200 (e.g., ECU 202). In this regard, owners of data device 300 and/or batteries 206 (e.g., a charging station company or vehicle manufacturer) may be third parties or service providers to the owner of vehicle 200. The data stored in the battery memory can remain encrypted or otherwise secured to prevent access to the data, which can safeguard against unauthorized access of the data, such as if the vehicle battery 206 is stolen.

Network 104 can include, for example, a local or wide area network, such as the Internet. In some implementations, vehicle 200 may alternatively or additionally communicate with remote data device 102 via network 104 using, for example, a wireless data link, which is illustrated in FIG. 1 with the dashed line between ECU 202 and network 104. As discussed in more detail below with reference to FIG. 6, this can provide an alternative to transferring additional data to data device 300 for storage at remote data device 102 or an alternative to transferring data from remote data device 102 to vehicle 200.

Those of ordinary skill in the art will appreciate with reference to the present disclosure that the number or arrangement of components may differ from what is shown in FIG. 1. For example, vehicle 200 will typically include many more sensors than sensor 208 shown in FIG. 1. In addition, vehicle 200 can include more processors than ECU 202 and additional memory for storing data. As another example variation, vehicle battery 206A may be charged without being removed from vehicle 200 in other implementations and the transfer of data between vehicle 200 and data device 300 may occur while vehicle 200 is physically connected to data device 300 without replacing vehicle battery 206A.

Figure 2:
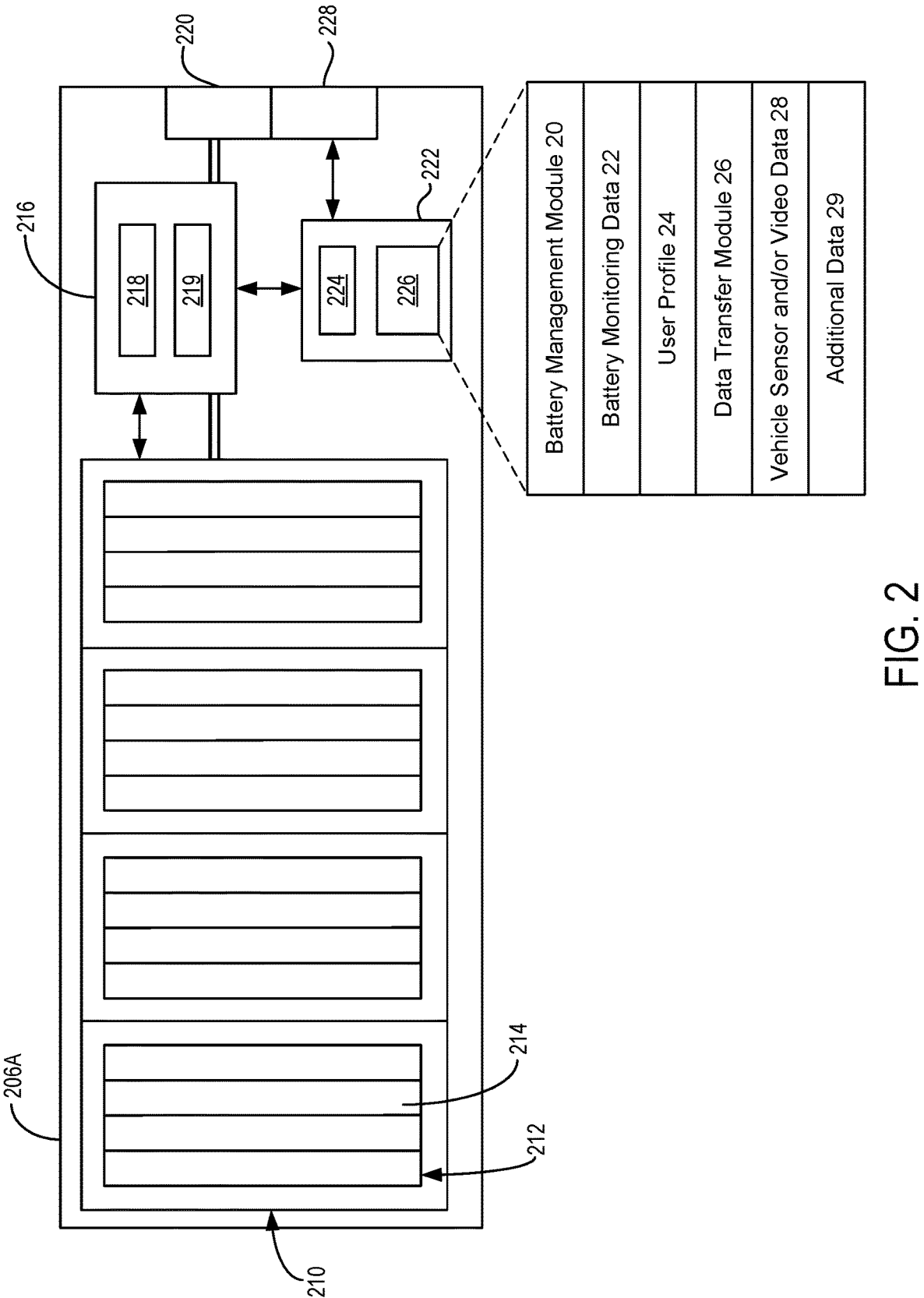
FIG. 2 is a block diagram of a vehicle battery according to one or more embodiments.

FIG. 2 is a block diagram of vehicle battery 206A according to one or more embodiments. As shown in FIG. 2, vehicle battery 206A includes battery pack 210 that includes battery modules, such as battery module 212, which further includes battery cells 214 that can be charged and discharged to provide electrical energy. The number of battery modules and battery cells shown in FIG. 2 are for the purposes of illustration, and vehicle battery 206A can include many more battery modules and battery cells than those shown in FIG. 2.

Vehicle battery 206A also includes battery controller 216, which may serve as a Battery Management System (BMS)

for controlling the charging and discharging of battery cells. Battery controller 216 includes processor 218 that can execute instructions, such as from battery firmware stored in battery controller memory 219 of battery controller 216 or battery management module 20 stored in battery memory 226. Processor 218 can include, for example, circuitry such as one or more CPUs, GPUs, microcontrollers, DSPs, ASICs, FPGAs, hard-wired logic, analog circuitry and/or a combination thereof. In some implementations, processor 218 can include an SoC that may be combined with battery controller memory 219.

Battery storage device 222 includes data storage controller 224 and battery memory 226. Data storage controller 224 can execute instructions, such as from data transfer module 26 stored in battery memory 226. Data storage controller 224 can include, for example, circuitry such as one or more CPUs, GPUs, microcontrollers, DSPs, ASICs, FPGAs, hard-wired logic, analog circuitry and/or a combination thereof.

Battery memory 226 includes storage media, such as a flash memory or other solid-state memory. As shown in FIG. 2, battery memory 226 is separate from battery controller 216, which includes its own memory, battery controller memory 219, as discussed above. While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, Electrically Erasable Programmable Read Only Memory (EE-PROM), other discrete Non-Volatile Memory (NVM) chips, or any combination thereof. In other implementations, memory nodes 110 and/or processing nodes 108 may include Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

In the example of FIG. 2, battery memory 226 stores battery management module 20, which can be used by battery controller 216 to control the charging and discharging of vehicle battery 206A. In some cases, battery management module 20 when executed by processor 218 can adjust the charging or discharging of vehicle battery 206A based on battery monitoring data 22, which can indicate different charging and/or discharging characteristics of the battery cells in vehicle battery 206A, such as how quickly the battery cells have previously charged, a total number of charges for vehicle battery 206A, a usage pattern of vehicle battery 206A, such as starting and ending voltages, current usage, or an efficiency of the battery cells in charging or discharging electrical energy. Battery monitoring data 22 can also include, for example, battery temperature changes when charging or discharging vehicle battery 206A or an ambient temperature or other environmental conditions while the battery is charged or discharged.

The adjustments made by battery management module 20 can include, for example, changing rates of charging or discharging the battery cells or an order for charging or discharging particular battery cells or battery modules based on battery monitoring data 22. In addition, battery monitoring data 22 may be used by battery controller 216, data device 300, and/or a remote device via network 104 to determine or estimate a remaining usable life for battery 206A before retiring or retrofitting the vehicle battery. In some implementations, battery monitoring data 22 can compare the usage of vehicle battery 206A in different vehicles or by different drivers for evaluating the health of vehicle battery 206A or for modifying vehicle battery 206A, such as modifications to a firmware for battery controller 216.

User profile 24 can include, for example, information about the vehicle's usage, such as whether the vehicle frequently replaces or charges its battery because of a high level of usage, such as for a robotaxi or delivery truck. In one example, an average amount of time between battery replacements or recharges may be stored as part of user profile 24. This information may then be used as a basis for a data retention metric or a data retention target by data storage controller 224 to adjust an amount of electrical energy taken from the battery cells to retain data in battery memory 226. For example, less electrical energy may be used to retain data in battery memory 226 if the battery is replaced or recharged more frequently, such as every day, as compared to a battery that may only be replaced or recharged every other week since the data stored in battery memory 226 does not need to remain stored for as long.

In another example, the frequency of replacement or recharging of vehicle battery 206A indicated by user profile 24 may also affect whether data is backed up or copied from another vehicle memory to battery memory 226, or instead directly stored in battery memory 226 as the data is recorded or collected. If user profile 24 indicates that the vehicle battery will be recharged or replaced before a threshold period of time, ECU 202 and/or data storage controller 224 may treat battery memory 226 as a primary storage since the data is likely to be transferred from battery memory 226 before reaching the storage limit of battery memory 226. In this regard, user profile 24 may also be used to determine the threshold period of time, an expected rate of data storage, or an expected amount of data to be stored in battery memory 226, which may also be considered by ECU 202 and/or data storage controller 224 in determining whether to use battery memory 226 as a secondary or primary storage location. In some cases, ECU 202 and/or data storage controller 224 may concurrently store data to both battery memory 226 and another memory of vehicle 200, while in other cases, ECU 202 and/or data storage controller 224 may copy data from a vehicle memory to battery memory 226 during idle periods when battery storage device 222 is less active.

As noted above, user profile 24 may include information particular to the vehicle or a driver, such as the type and/or amount of data being stored in battery memory 226. For example, user profile 24 may indicate a certain amount of data expected to be read from battery memory 226 as compared to being written so that a cache can be sized for the amount of data expected to be read. As another example, user profile 24 may provide that the majority of the data being stored in battery memory 226 is a video data stream so that a contiguous address range is allocated in battery memory 226 for the video data stream that may, for example, be constantly recording while the vehicle is powered on and may overwrite the allocated address range from the beginning of the address range after reaching the end of the address range.

Data transfer module 26 in FIG. 2 can be used by data storage controller 224 to transfer data between battery storage device 222 and data device 300, in addition to transferring data between battery storage device 222 and one or more processors of the vehicle, such as ECU 202 in FIG. 1. In addition, data transfer module 26 may be used to control usage of battery memory 226, such as determining where different types of data are stored in battery memory 226 and/or to implement different data retention policies, such as power usage by battery memory 226, eviction of old data, and refreshing or erasing memory blocks.

Vehicle sensor and/or video data 28 can include sensor data and/or video data recorded by the vehicle. As noted above, vehicle sensor and/or video data 28 can include black box data that may continually be recorded by the vehicle or may only be retained immediately before, during, and after a crash detected by one or more sensors of the vehicle (e.g., sensor 208 in FIG. 1). In such implementations, black box data may be continually overwritten in battery memory 226, may serve as an overflow or backup storage for another memory in the vehicle, or may be the primary storage location for such black box data.

In some implementations, vehicle sensor and/or video data 28 can include other types of data, such as information on a path of travel of the vehicle, an amount of time the vehicle was stopped or exceeded a speed limit, or whether the vehicle was stopped due to traffic or driver intent. In some cases, vehicle sensor and/or video data 28 may be used by a service technician to diagnose problems with the vehicle, such as error codes or sensor values.

As discussed in more detail below, battery storage device 222 can be used to transfer additional data to the vehicle, such as firmware or software updates, delivery routes, driver instructions, and maps. Such additional data can be stored as additional data 29 that can be received from data device 300 and/or via network 104, such as from remote data device 102 in FIG. 1. Additional data 29 may then be accessed by one or more processors of the vehicle, such as ECU 202.

Battery controller 216 can serve as a Battery Management System (BMS) that includes circuitry such as power protection circuitry, current converters, and/transformers. In some implementations, battery controller 216 can include a thermal management system for cooling battery pack 210. Electrical energy can be passed from battery pack 210 to battery controller 216 and to power interface 220, which may be used for both charging and discharging vehicle battery 206A. In other implementations, separate power interfaces may be used for charging and discharging vehicle battery 206A.

As shown in FIG. 2, vehicle battery 206A also includes data interface 228 for transferring data between battery storage device 222 and data device 300 and/or between battery storage device 222 and the vehicle by providing a physical data connection to data device 300 and/or vehicle 200. In other implementations, separate data interfaces may be used for communicating with the vehicle and data device 300. As shown in FIG. 1, a single cable 318 with separate charging and data wiring may be used for charging vehicle battery 206A and for transferring data between battery storage device 222 and data device 300. In other implementations, separate cabling may instead be used for charging and for data transfer. In yet other implementations, a removable storage media may be used to transfer data to and/or from battery storage device 222.

Those of ordinary skill in the art will appreciate with reference to the present disclosure that other implementations may include a different number or arrangement of components, modules, or data structures than shown in FIG. 2. For example, other implementations of vehicle battery 206A may include additional data interfaces or power interfaces dedicated to connecting to the vehicle in addition to data device 300 or a vehicle charger. As another example, some implementations of vehicle battery 206A may combine, for example, user profile 24 and additional data 29 into a single data structure or may not store all of battery monitoring data 22, user profile 24, vehicle sensor and/or video data 28, and additional data 29 in the same battery memory 226. As another example variation, battery management module 20 may instead be stored in battery controller memory 219 instead of in battery memory 226.

Figure 3:
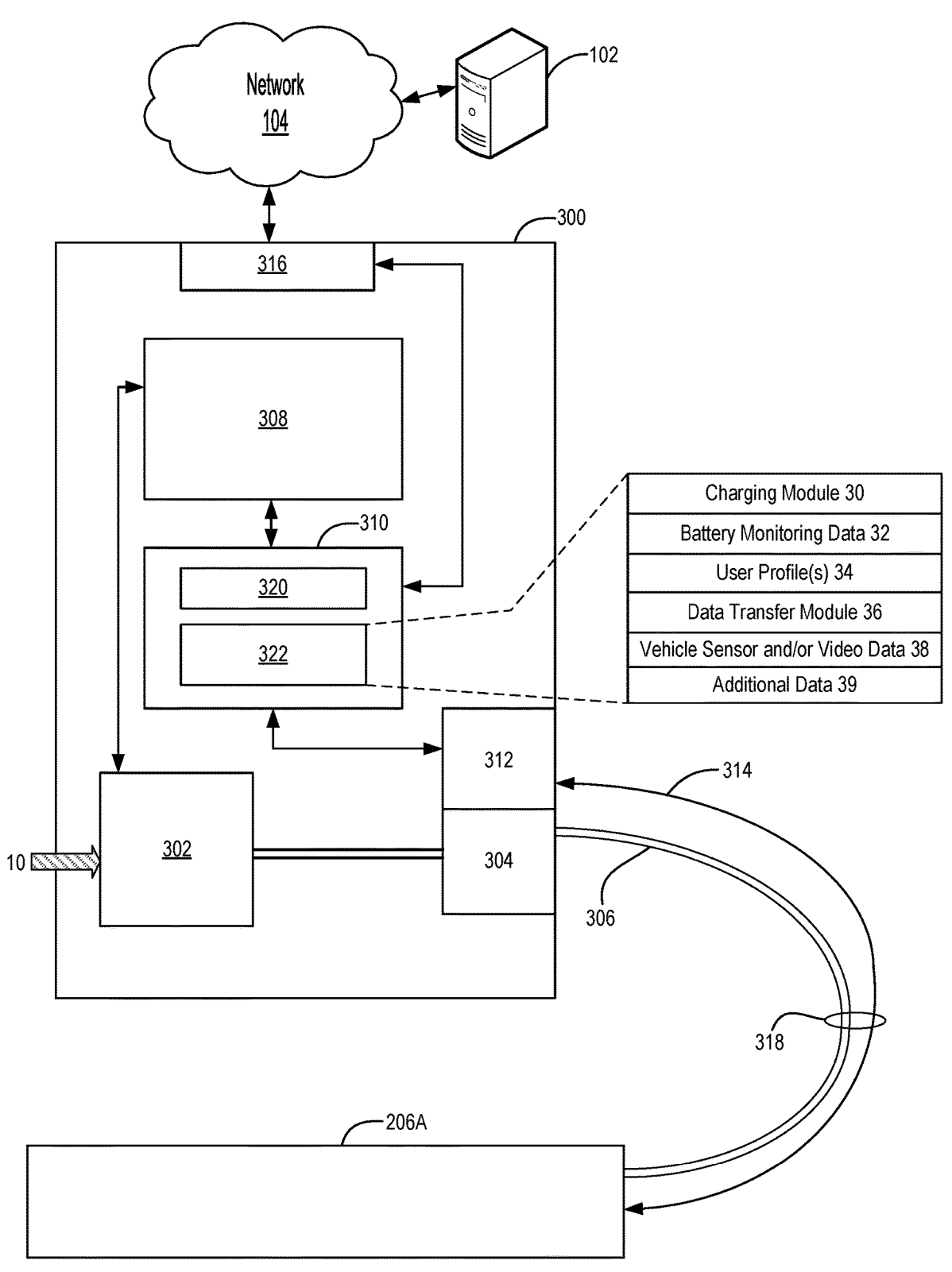
FIG. 3 is a block diagram of an external data device connected to a vehicle battery according to one or more embodiments.

FIG. 3 is a block diagram of data device 300 connected to vehicle battery 206A according to one or more embodiments. As compared to the example of FIG. 1 where vehicle battery 206B is connected to data device 300, the example of FIG. 3 can be at a later point in time after vehicle battery 206A has been removed from vehicle 200 and is connected to data device 300 for charging and for transferring data to and/or from vehicle battery 206A.

As shown in FIG. 3, data wiring 314 of cable 318 physically connects to data interface 312 of data device 300 for transferring data between vehicle battery 206A and data device 300. Power wiring 306 of cable 318 physically connects to power interface 304 of data device 300 for charging vehicle battery 206A. Data device 300 receives power from mains power supply 10 and uses power management circuitry 302 to provide power to power interface 304. Power management circuitry 302 can include, for example, power circuitry, such as power protection circuitry, current converters, and/or transformers for supplying electrical energy to battery 206A.

Charging controller 308 controls power management circuitry 302 and can include, for example, circuitry such as one or more CPUs, GPUs, microcontrollers, DSPs, ASICs, FPGAs, hard-wired logic, analog circuitry and/or a combination thereof. In some implementations, charging controller 308 can include an SoC that may include its own memory, such as a DRAM or other solid-state memory.

Data controller 310 of data device 300 includes processor 320 and memory 322. Processor 320 can include, for example, circuitry such as one or more CPUs, GPUs, microcontrollers, DSPs, ASICs, FPGAs, hard-wired logic, analog circuitry and/or a combination thereof. In some implementations, processor 320 can include an SoC that may be combined with memory 322, which can include, for example, a DRAM or may include other solid-state memory, such as a non-volatile flash memory. As discussed in more detail below, processor 320 can provide a means for transferring data from a battery memory to memory 322 and/or transferring data from memory 322 to the battery memory.

In the example of FIG. 3, memory 322 stores charging module 30, battery monitoring data 32, one or more user profiles 34, data transfer module 36, vehicle sensor and/or video data 38, and additional data 39. Charging module 30 can be used by charging controller 308 to control charging of vehicle battery 206A, such as by regulating the current or a rate of charging suited to characteristics of vehicle battery 206A that may be represented in battery monitoring data retrieved from vehicle battery 206A by data controller 310 and stored as part of battery monitoring data 32.

In some implementations, battery monitoring data 32 can indicate different charging and/or discharging characteristics of the battery cells in vehicle battery 206A, such as how quickly the battery cells have previously charged, a total number of charges for vehicle battery 206A, a usage pattern of vehicle battery 206A, such as starting and ending voltages, current usage, or an efficiency of the battery cells in charging or discharging. Battery monitoring data 32 can also include, for example, battery temperature changes when previously charging or discharging vehicle battery 206A or an ambient temperature or other environmental conditions while the battery was charged or discharged.

In addition, charging controller 308 may also generate battery monitoring data based on the charging of vehicle battery 206A that is provided to data controller 310 to update battery monitoring data 32 for vehicle battery 206A. As noted above, battery monitoring data 32 may be used by processor 320 of data controller 310, and/or a remote device via network 104, such as remote data device 102, to determine or estimate a remaining usable life for vehicle battery 206A before retiring or retrofitting the vehicle battery. The additional battery monitoring data provided by charging controller 308 can be used to update an estimate for a remaining usable life or other health metric for vehicle battery 206A, which can also form part of battery monitoring data 32.

In some implementations, data device 300 may provide the updated battery monitoring data for vehicle battery 206A to a remote device by communicating on network 104 via network interface 316, which can include, for example, an Ethernet interface. The remote device, such as remote data device 102, may use the battery monitoring data received from data device 300 for analyzing patterns among many vehicle batteries, such as for a fleet of vehicles, to determine, for example, usage patterns, charging patterns, or statistics such as an average estimate lifespan for vehicle batteries used by the fleet of vehicles. In other cases, the remote device may simply store the updated battery monitoring data and associate it with a unique identifier for vehicle battery 206A.

The one or more user profiles 34 stored in memory 322 of data device 300 can include information specific to a driver and/or a vehicle that was powered by vehicle battery 206A, or an owner of multiple vehicles that use vehicle battery 206A, such as a delivery company or a robotaxi company. In some cases, memory 322 of data device 300 can store different user profiles for multiple drivers, vehicles, and/or vehicle owners that typically use data device 300. A user profile may be retrieved from vehicle battery 206A by data controller 310 and stored with an identifier for the user, vehicle, or owner.

User profile(s) 34 can include, for example, information about a vehicle's usage, such as whether the vehicle frequently replaces or recharges its battery because of a high level of usage, such as for a robotaxi or delivery truck. In one example, the average amount of time between battery replacements or recharging may be stored as part of user profile 34. In some implementations, user profile 34 may include the type and/or amount of data being stored in a battery memory of vehicle battery 206A. For example, user profile 34 may indicate an amount of data expected to be read from the battery memory as compared to being written so that a cache can be sized for the amount of data expected to be read. As another example, user profile 34 may provide that the majority of the data being stored in the battery memory is a video data stream so that a contiguous address range is used in the battery memory for the video data stream that may be constantly recording while the vehicle is powered on. The user profile retrieved from vehicle battery 206A by data device 300 can be used by data controller 310 to associate other data retrieved from vehicle battery 206A with the particular driver, vehicle, or owner of the vehicle.

Such data retrieved by data device 300 can include, for example, vehicle sensor and/or video data 38 stored in memory 322. Vehicle sensor and/or video data 38 can include sensor data and/or video data recorded by the vehicle since a previous charging or data transfer from vehicle battery 206A. As noted above, this can allow for more data to be recorded and retained since the battery memory can be freed after transferring the data to data device 300 in some implementations. The vehicle sensor and/or video data can include, for example, black box data such as video data from immediately before, during, and after a crash detected by one or more sensors of the vehicle. In other cases, vehicle sensor and/or video data 38 can include error codes or other sensor data that can be used to diagnose problems or maintenance issues for the vehicle that was powered by vehicle battery 206A. Vehicle sensor and/or video data 38 may include other types of data, such as information on a path of travel of the vehicle, an amount of time the vehicle was stopped or exceeded a speed limit, or whether the vehicle was stopped due to traffic or driver intent.

Additional data 39 includes data that is transferred from data device 300 to vehicle battery 206A via data interface 312. Such additional data can include, for example, firmware or software updates for a vehicle, delivery routes, driver instructions, and maps. In some implementations, additional data 39 can be received by data device 300 via network 104, such as from remote data device 102. In other cases, additional data 39 may be supplied by a removable storage media, such as a removable flash drive connected to data device 300.

Those of ordinary skill in the art will appreciate with reference to the present disclosure that other implementations of data device 300 can vary from the components and modules shown in FIG. 3. For example, power management circuitry 302, power interface 304, power wiring 306, and charging controller 308 may be omitted in implementations where data device 300 does not charge the vehicle battery. In such implementations, data device 300 can be a separate device that may be connected to the vehicle battery while it is being charged by a vehicle charger or even while the vehicle battery is not being charged. In such implementations, memory 322 of data controller 310 would not store charging module 30, but other modules and data structures such as battery monitoring data 32, user profile(s) 34, data transfer module 36, vehicle sensor and/or video data 38, and additional data 39 may still be stored in memory 322 and used by data controller 310 in transferring data between data device 300 and vehicle battery 206A.

Example Processes

Figure 4:
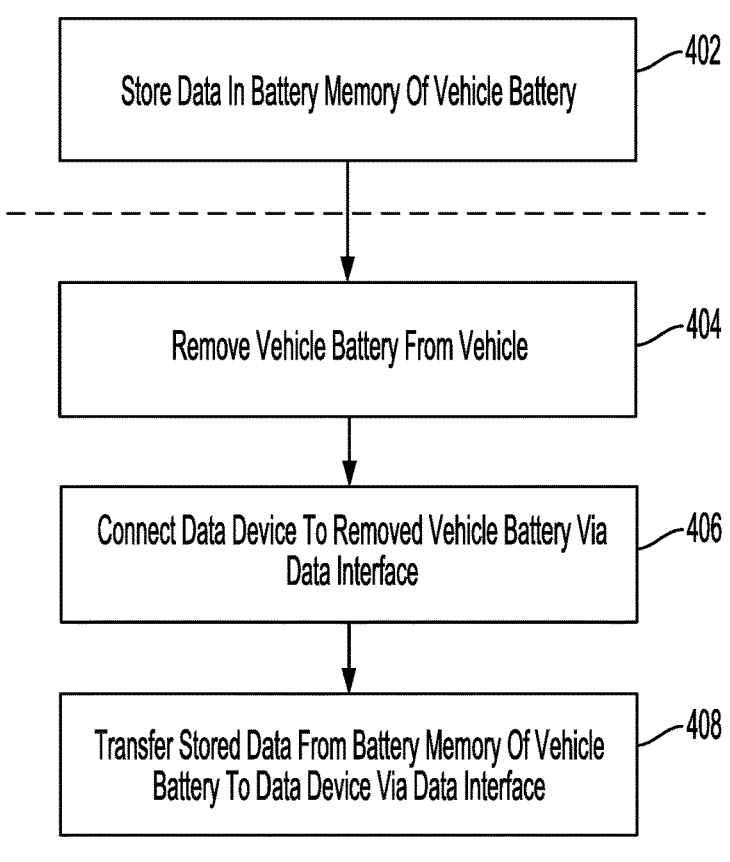
FIG. 4 is a flowchart for a data transfer process from a vehicle to an external data device according to one or more embodiments.

FIG. 4 is a flowchart for a data transfer process from a vehicle to an external data device according to one or more embodiments. The data transfer process of FIG. 4 may be performed using, for example, vehicle 200, vehicle battery 206A, and data device 300.

In block 402, data is stored in the vehicle battery by a vehicle that is powered by the vehicle battery. The storage of the data in the vehicle battery can be performed by, for example, a data storage controller (e.g., data storage controller 224 in FIG. 2) of the vehicle battery and/or a processor of the vehicle (e.g., ECU 202 in FIG. 1). The data may include, for example, data recorded by the vehicle, such as data from sensors of the vehicle or from a video camera of the vehicle. In such cases, sensors, cameras, and/or one or more processors of the vehicle (e.g., ECU 202 in FIG. 1) may generate the data. The stored data can serve as a primary storage location for the vehicle or may serve as a backup or secondary storage location.

In other cases, the data may be generated by the vehicle battery itself while it is connected to the vehicle, such as by a battery controller (e.g., battery controller 216 in FIG. 2), generating battery monitoring data pertaining to the charging of the vehicle battery and/or the use of the vehicle battery. Examples of such battery monitoring data can include information on how quickly the vehicle battery is charging, a total number of charges for the vehicle battery, a usage pattern of the vehicle battery, voltages of the vehicle battery, currents generated in using the vehicle battery, or an efficiency of the vehicle battery in charging or discharging electrical energy.

In block 404, the vehicle battery is removed from the vehicle. This may be performed at, for example, a charging station to charge the vehicle battery or replace the vehicle battery with a different, fully charged battery. The dashed line between blocks 402 and 404 in FIG. 4 indicates that the data stored in block 402 may occur over a period of time before removal of the vehicle battery in block 404.

In block 406, the vehicle battery is physically connected to a data device that is external or separate to the vehicle (e.g., data device 300 in FIG. 1) after the vehicle battery is removed from the vehicle. In some implementations, the vehicle battery may also be physically connected for charging the vehicle battery via a power interface of the vehicle battery in addition to transferring data from the vehicle battery via a data interface of the vehicle battery. In such implementations, the external data device may also serve as a battery charger.

In block 408, the data stored in the vehicle battery is transferred from the vehicle battery to the data device via a data interface. The data interface can include a physical connection to the vehicle battery to provide an efficient and secure means of transferring the data. As noted above, transferring data from a vehicle battery to the data device can occur while the vehicle battery is charged, which can provide relatively frequent transfer of data from the vehicle to enable the storage of more data after the old data has been transferred from the vehicle battery.

Those of ordinary skill in the art will appreciate with reference to the present disclosure that the order of blocks shown in FIG. 4 may differ in other implementations. For example, other implementations may not include a removable vehicle battery and may instead transfer data from the vehicle battery to the data device while the vehicle battery is still connected to the vehicle. In such an implementation, block 404 can be omitted from FIG. 4 for the removal of the vehicle battery from the vehicle.

Figure 5:
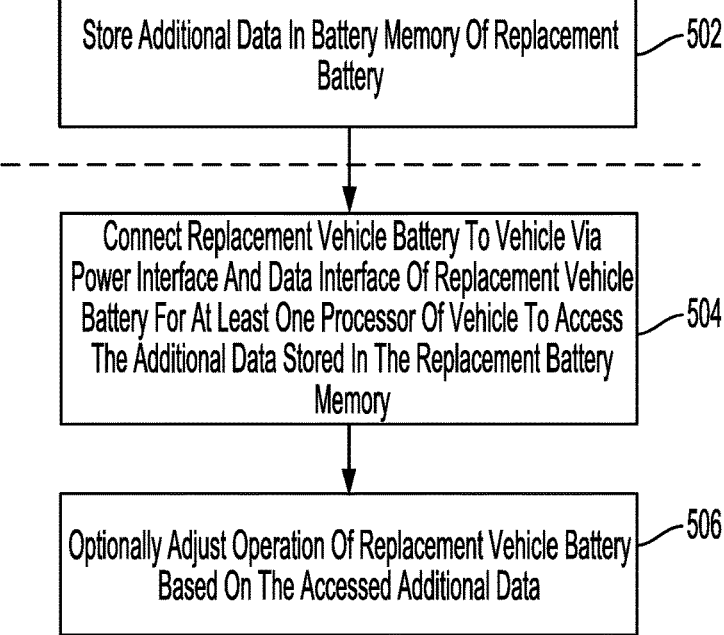
FIG. 5 is a flowchart for a data transfer process from an external data device to a vehicle according to one or more embodiments.

FIG. 5 is a flowchart for a data transfer process from an external data device to a vehicle according to one or more embodiments. The process of FIG. 5 may be performed using, for example, vehicle 200, vehicle battery 206B, and data device 300.

In block 502, additional data is stored in a battery memory of a replacement battery. The additional data can be preloaded data in the sense that it is data that has not already been accessed by one or more processors of a vehicle that will be powered by the replacement battery. The storing of the additional data in the battery memory may be performed by, for example, a data controller or processor of the data device (e.g., processor 320 of data controller 310 in FIG. 3) by transferring the additional data from a memory of the data device (e.g., memory 322 in FIG. 3) to the battery memory of the replacement battery. The additional data can include data for access by one or more processors of the vehicle, such as additional data 39 in FIG. 3. For example, the additional data can include software updates for the vehicle, delivery routes, driver instructions, and maps. This data may be downloaded to the data device via a network or may be retrieved by the data device from a removable storage medium.

In block 504, the replacement vehicle battery is physically connected to the vehicle via a power interface and a data interface of the replacement vehicle battery. One or more processors of the vehicle, such as an ECU, can then access the additional data stored in the battery memory of the replacement battery. The replacement battery serves a dual purpose of powering the vehicle and transferring the additional data to the vehicle, without having to wait for the additional data to be transferred or downloaded from the perspective of the vehicle since the data can be preloaded to the replacement battery in advance of the replacement battery's connection to the vehicle. The dashed line between blocks 502 and 504 in FIG. 5 indicates that the additional data stored in block 502 may occur well before the connection of the replacement vehicle battery to the vehicle in block 504.

In block 506, the replacement battery may optionally adjust its operation based on the additional data accessed by the vehicle. For example, the additional data stored in the different battery memory can indicate characteristics about the replacement battery or its expected usage by the vehicle. Such data can be used by the vehicle to adjust operation of the replacement battery such as by changing how the battery cells in the replacement battery are discharged, an order for discharging the battery cells, or a rate of discharging the battery cells. In other examples, the additional data may include information particular to the vehicle or a driver, such as the type and/or amount of data being stored in the replacement battery memory. For example, the additional data may indicate a certain amount of data expected to be read from the battery memory as compared to being written so that a cache can be sized for the amount of data expected to be read.

As another example, the additional data may provide that the majority of the data being stored in the battery memory is a video data stream so that a contiguous address range is used in the battery memory for the video data stream that may be recording while the vehicle is powered on. As yet another example, the additional data may indicate an expected frequency of use of the replacement battery or an expected time until the replacement battery needs to be replaced or recharged. This information can be used by the vehicle or the replacement battery to adjust data retention policies, such as how much power to use to retain data in the battery memory, how often to evict old data from the battery memory to make room for new data, or how often to refresh or erase memory blocks for writing new data.

Those of ordinary skill in the art will appreciate with reference to the present disclosure that other implementations may differ from the blocks shown in the flowchart of FIG. 5. For example, other implementations may not include block 506, such that the operation of the replacement vehicle battery is not adjusted based on the additional data accessed from the battery memory. As another example variation, the vehicle battery may remain in the vehicle and may not be replaced such that the additional data can be stored in the vehicle battery when the vehicle is connected to a charging station.

Figure 6:
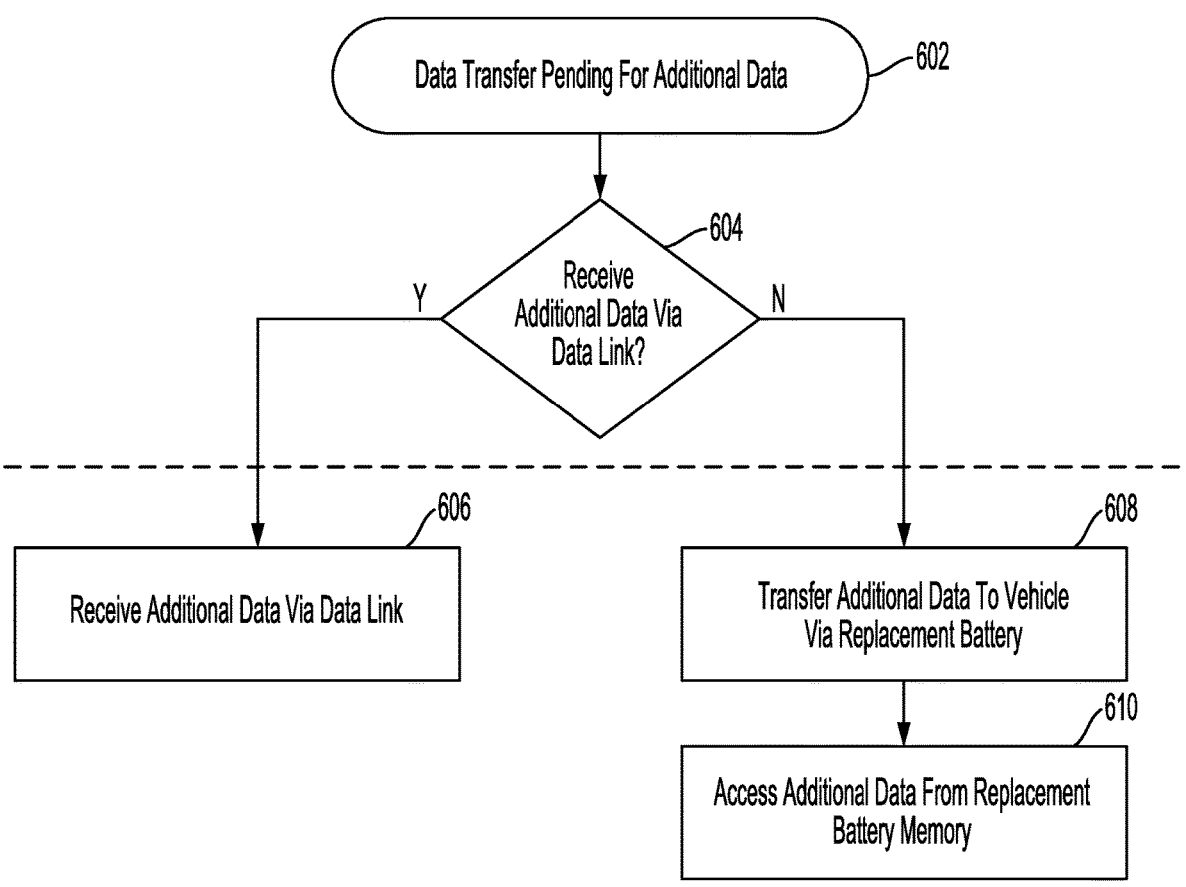
FIG. 6 is a flowchart for a data transfer determination process according to one or more embodiments.

FIG. 6 is a flowchart for a data transfer determination process according to one or more embodiments. The data transfer determination process of FIG. 6 may be performed, for example, by a processor of a vehicle (e.g., an ECU) and/or a data storage controller of a vehicle battery.

In block 602, a data transfer is pending for a vehicle for additional data. A processor of the vehicle, such as an ECU, may receive an indication, such as through a wireless network, that a software update, such as for an operating system of the vehicle, or other additional data is available for downloading or otherwise transferring to the vehicle.

In block 604, the processor of the vehicle determines whether to receive the additional data via a data link or by replacing the vehicle battery based on at least one of a characteristic associated with the vehicle battery and a characteristic associated with the additional data to be transferred to the vehicle. For example, the processor may determine to wait until the vehicle battery is replaced if the additional data is greater than a threshold size or if the additional data is indicated as being an important update to reduce the likelihood of error through other means, such as a wireless connection. As another example, the processor may determine to use the data link to receive the data if the vehicle's previous usage of one or more vehicle batteries, which may be included in a user profile stored in a currently used battery memory, indicates that the average time between replacement or recharging of the vehicle battery is greater than a threshold period of time.

If it is determined that the additional data is to be received via the data link, the vehicle in block 606 receives the additional data via the data link, which may include receiving the additional data via a wireless internet connection or from a removable storage media inserted into the vehicle. On the other hand, if the vehicle's processor determines to wait until the vehicle's battery is replaced, the vehicle battery is replaced in block 608 to transfer the additional data to the vehicle. The dashed line between block 604 and blocks 606 and 608 in FIG. 6 indicates that a period of time may separate the determination made in block 604 from the actions taken in blocks 606 or 608.

In the case where the vehicle's processor determines to wait until the vehicle battery is replaced, the transfer of the additional data via the battery memory of the replacement battery can be performed as described above for the data transfer process of FIG. 5. In this regard, the additional data can be preloaded or stored in the battery memory of the replacement battery before the vehicle arrives at the charging station or before the currently installed vehicle battery is removed from the vehicle to reduce downtime. In block 610, the vehicle's processor accesses the additional data via the battery memory of the replacement battery.

Those of ordinary skill in the art will appreciate with reference to the present disclosure that other implementations of the data transfer determination process may differ than the example of FIG. 6. For example, in other implementations, the vehicle battery may not be replaced and the data transfer of block 608 may occur when the current vehicle battery is being charged at a charging station without removing the vehicle battery from the vehicle.

The foregoing data transfer processes using a vehicle battery memory can enable a more efficient transfer of data between a vehicle and a data device and/or a remote data device since vehicle batteries typically need to be recharged or replaced often. In addition, more data can be stored or recorded by the vehicle since the data stored in the battery memory can be backed-up or transferred during charging or replacement of the vehicle battery to provide new storage capacity in the recharged or replacement vehicle battery.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A vehicle battery for powering a vehicle, wherein the vehicle battery is removable from the vehicle for charging, the vehicle battery comprising:

a at least one battery cell configured to store an electrical charge;

a battery controller configured to control charging of the at least one battery cell;

a power interface configured to connect to a power source for charging the at least one battery cell;

a battery memory including storage media, wherein the battery memory is separate from the battery controller, wherein the battery memory is configured to store data, the data comprising: one or more user profiles, at least one of sensor data and video data, and battery monitoring data, and wherein the user profile determines whether the battery memory is treated as a primary or secondary storage location of the data based on when the vehicle battery is likely to be replaced or recharged;

a data interface configured to transfer data between the battery memory and a data device that is external to the vehicle; and a data storage controller configured to:

perform, via the data interface, at least one of transferring data from the battery memory to the external data device and transferring data from the external data device to the battery memory while the vehicle battery is removed from the vehicle;

receive a user profile of the one or more user profiles from the data device and from the battery memory; and adjust operation of the battery memory based on the user profile.

2. The vehicle battery of claim 1, further comprising a battery controller memory configured to store a firmware of the vehicle battery.

3. The vehicle battery of claim 1, wherein the data storage controller is further configured to:

receive the at least one of sensor data and video data recorded by the vehicle; and store the received at least one of sensor data and video data in the battery memory.

4. The vehicle battery of claim 3, wherein the at least one of sensor data and video data is a backup copy of data stored in a separate memory of the vehicle that is external to the vehicle battery.

5. The vehicle battery of claim 1, wherein the data storage controller is further configured to:

receive the battery monitoring data from the battery controller; and store the battery monitoring data in the battery memory; and wherein the battery controller is further configured to:

retrieve the battery monitoring data from the battery memory; and adjust at least one of charging and discharging of the at least one battery cell based on the retrieved battery monitoring data.

6. The vehicle battery of claim 1, wherein the data storage controller is further configured to:

receive data from the data device;

store the received data in the battery memory; and provide the data stored in the battery memory to at least one processor of the vehicle.

7. A method of transferring data between a vehicle and a data device separate from the vehicle, the method comprising:

storing the data in a vehicle battery configured to power the vehicle, wherein the vehicle battery comprises:

at least one battery cell configured to store an electrical charge;

a battery controller configured to control charging of the at least one battery cell;

a power interface configured to connect to a power source for charging the at least one battery cell;

a battery memory including storage media, wherein the battery memory is separate from the battery controller, and wherein the battery memory is configured to store data, the data comprising: one or more user profiles, at least one of sensor data and video data, and battery monitoring data, and wherein the user profile determines whether the battery memory is treated as a primary or secondary storage location of the data based on when the vehicle battery is likely to be replaced or recharged;

a data interface configured to transfer data between the battery memory and the data device that is external to the vehicle; and a data storage controller configured to:

perform, via the data interface, at least one of transferring data from the battery memory to the external data device and transferring data from the external data device to the battery memory while the vehicle battery is removed from the vehicle;

receive a user profile of the one or more user profiles from the data device and from the battery memory; and adjust operation of the battery memory based on the user profile;

removing the vehicle battery from the vehicle;

physically connecting the data device to the removed vehicle battery via a data interface of the vehicle battery; and transferring the stored data from the battery memory of the vehicle battery to the data device via the data interface.

8. The method of claim 7, further comprising charging the removed vehicle battery via a power interface of the vehicle battery while the stored data is transferred from the battery memory to the data device.

9. The method of claim 7, further comprising:

storing additional data in a different battery memory of a replacement vehicle battery; and connecting the replacement vehicle battery to a different data interface of the replacement vehicle battery, wherein at least one processor of the vehicle accesses the additional data from the replacement vehicle battery.

10. The method of claim 7, further comprising determining, by at least one processor of the vehicle, whether to receive additional data via a data link or by replacing the vehicle battery based at least in part on at least one of a characteristic associated with the vehicle battery and a characteristic associated with the additional data.

11. The method of claim 10, wherein the additional data includes the user profile, and the method further comprises adjusting operation of a replacement vehicle battery memory based on the user profile.

12. The method of claim 7, wherein the data stored in the battery memory of the vehicle battery includes the at least one of sensor data and video data recorded by the vehicle.

13. The method of claim 12, further comprising copying the at least one of sensor data and video data to store in the battery memory of the vehicle battery as a backup copy.

14. The method of claim 7, wherein the data stored in the battery memory of the vehicle battery includes the battery monitoring data determined by the battery controller of the vehicle battery, and wherein the method further comprises:

retrieving the battery monitoring data from the battery memory; and adjusting at least one of charging and discharging of at least one battery cell of the vehicle battery based on the retrieved battery monitoring data.

15. A data device external to a vehicle, the data device comprising:

a memory configured to store data; and means for performing at least one of transferring data from a battery memory of a vehicle battery to the memory and transferring data from the memory to the battery memory of the vehicle battery, wherein the data is transferred while the data device is physically connected to the vehicle battery, wherein the vehicle battery comprises:

at least one battery cell configured to store an electrical charge;

a battery controller configured to control charging of the at least one battery cell;

a power interface configured to connect to a power source for charging the at least one battery cell;

the battery memory including storage media, wherein the battery memory is separate from the battery controller, and wherein the battery memory is configured to store data, the data comprising: one or more user profiles, at least one of sensor data and video data, and battery monitoring data, and wherein the user profile determines whether the battery memory is treated as a primary or secondary storage location of the data based on when the vehicle battery is likely to be replaced or recharged;

a data interface configured to transfer data between the battery memory and the data device that is external to the vehicle; and a data storage controller configured to:

perform, via the data interface, at least one of transferring data from the battery memory to the external data device and transferring data from the external data device to the battery memory while the vehicle battery is removed from the vehicle;

receive a user profile of the one or more user profiles from the data device and from the battery memory; and adjust operation of the battery memory based on the user profile.

16. The data device of claim 15, wherein the transferred data includes the user profile transferred from the memory of the data device to the battery memory of the vehicle battery for adjusting operation of the battery memory based on the user profile.

17. The data device of claim 15, wherein the transferred data includes the at least one of sensor data and video data recorded by the vehicle and transferred from the battery memory of the vehicle battery to the memory of the data device.

18. The data device of claim 15, further comprising a charging controller;

wherein the transferred data includes battery monitoring data transferred from the battery memory of the vehicle battery to the memory of the data device; and wherein the charging controller is configured to control charging of the vehicle battery based on the transferred battery monitoring data.

19. The data device of claim 15, wherein the transferred data includes a software update transferred from the memory of the data device to the battery memory of the vehicle battery for updating software executed by at least one processor of the vehicle.

* * * * *